Lyman Wight. REISSUED AUG 1 1871
Broadcast Seeder and Cultivator.
4499
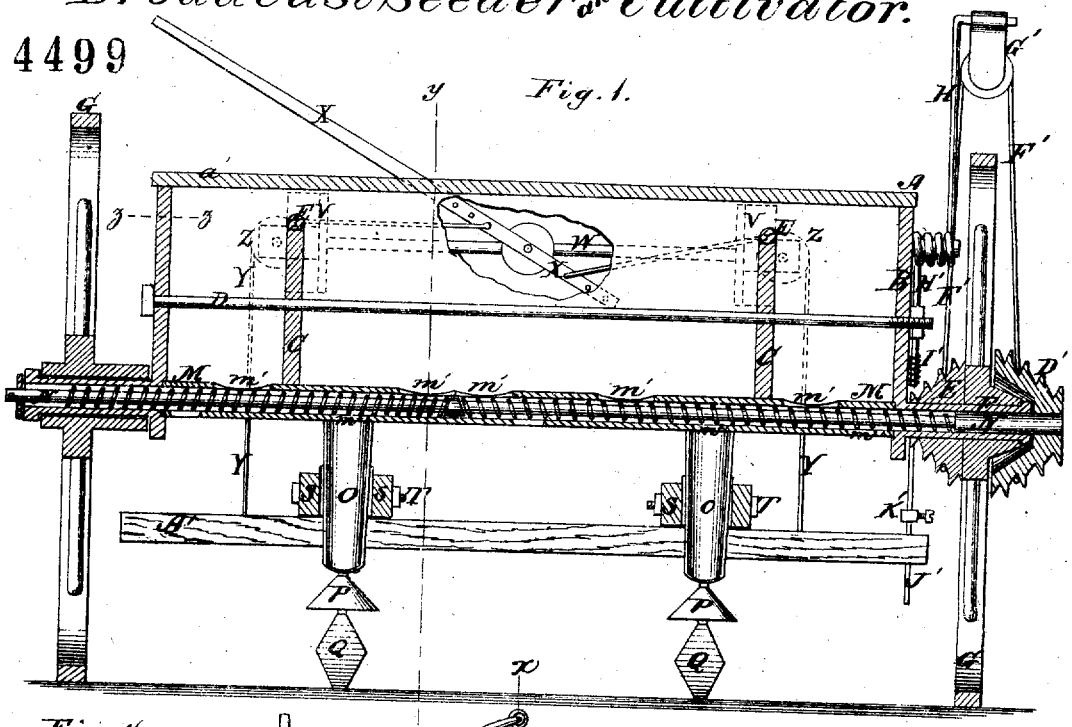
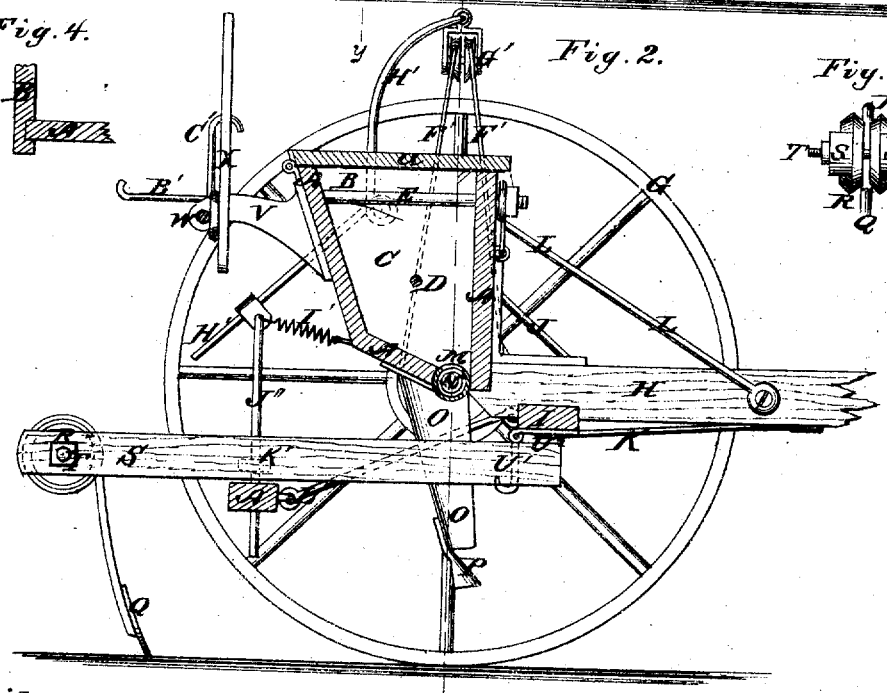
Fig. 4.
Fig. 3.
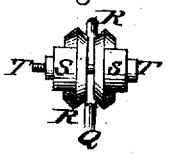
Witnesses.
E. F. Shultman
A. C. Rawlings.
Inventor.
Lyman Wight.
By Hill & Greenwood
His Attorneys.
AM. PHOTO-LITHOGRAPHIC CO. N.Y. (OSBORNE'S PROCESS.)

UNITED STATES PATENT OFFICE.

LYMAN WIGHT, OF WHITEWATER, ASSIGNOR TO HIMSELF AND O. G. EWING, OF LA GRANGE, WISCONSIN.

IMPROVEMENT IN GRAIN-DRILLS.

Specification forming part of Letters Patent No. 112,663, dated March 14, 1871; reissue No. 4,499, dated August 1, 1871.

*To all whom it may concern:*

Be it known that I, LYMAN WIGHT, of Whitewater, in the county of Walworth and State of Wisconsin, have invented certain new and useful Improvements in Broadcast-Seeders and Cultivators; and I do hereby declare the following to be a full, clear, and exact description of the same, reference being had to the accompanying drawing forming part of this specification, in which—

Figure 1 is a vertical section taken in the plane of the line *x x*, Fig. 2; Fig. 2, a vertical section of the same taken in the plane of the line *y y*, Fig. 1; Fig. 3, a detail view of the devices for holding the drag-teeth; and Fig. 4, a detail section of the seed-box taken in the line *y y*, Fig. 1.

Similar letters of reference indicate corresponding parts in the several figures of the drawing.

My invention has for its object to improve the construction of seeding-machines of that class which is adapted for use either as a broadcast-seeder or as a combined seeder and coverer. To this end the invention consists, first, in supporting all the parts of the machine from the driving-wheels by means of axles formed upon the ends of the seed-box or hopper, for the purpose of doing away with the supporting frame-work, for reducing the weight, cheapening the cost of manufacture, and insuring uniformity of action in its various parts. It further consists in constructing the bottom and rear side of the seed-box inclined and the front side vertical, for the purpose of preventing the seed from clogging or bridging over in the seed-box. It further consists in the construction of the seed-box and its various parts, and in the method of attaching the drag-teeth to their beams. It further consists in the means employed for transmitting motion from the driving-wheel of the machine to the seed-discharging devices, and in the combination of parts by which the movements of said devices are produced and controlled. It finally consists in the means employed for raising and lowering the drag-teeth when the driver is either walking or riding.

In the accompanying drawing, A is the seed-box, the front board of which is made vertical, and the bottom and rear side inclined, as shown in Fig. 2, so as to cause the seed to pass down freely into the angle between the front side and bottom, thereby preventing it from clogging or bridging to obstruct the flow. The ends B of the box are made of cast metal, with grooves or flanges formed in them to receive the ends of the front, bottom, and rear boards. The seed-box is strengthened by one or more cross-partitions, C, by a longitudinal bolt, D, passing through the ends B, and by cross-bolts E passing through the front and rear sides. By this construction the seed-box is made so strong that no frame is required to support it. The end pieces B are cast with hollow axles F, upon which the hubs of the wheels G work, as shown in Fig. 1. H is the tongue, secured to the middle of the seed-box and provided with a cross-bar, I, whose ends are connected to the ends of said box by means of rods J, and to the tongue by the brace-rods K. L are brace-rods, the lower ends of which are secured to the tongue H and the upper ends to the ends of the cross-bolts E. In the angle between the front and bottom boards of the box A is secured a pipe, M, which serves as a continuation of the hollow axles F, as shown in Fig. 1. In the upper side of the pipe M are formed several holes, $m^1$, for the seed to enter, and in the lower side, at suitable distances apart, and in positions not directly beneath the ingress-openings, are formed egress-openings $m^2$, through which the seed escapes from said pipe to the ground. N is a rod, extending through the pipe M and hollow axles F from side to side of the machine, upon which are formed screw-threads by winding a wire of suitable form and size spirally around it, or by cutting the said thread upon the rod, or by any other suitable means. To the bottom of the seed-box A, around the discharge-openings $m^2$ of the pipe M, are secured the upper ends of conductor-spouts O, which receive the seed from said openings and conduct it to the ground. To the lower ends of the spouts O are attached the cones or semi-cones P, upon which the seeds from the spouts O fall, and by which they are scattered. Q are the drag-teeth, the upper ends of whose shanks are bent over to form an eye. R are two washers, the inner edges of which are beveled off, and the outer sides formed with shoulders to receive the rear ends of the two beams S. The washers R are placed one upon each side of the eye of the plow-shanks, and the washers and eye placed between the rear ends of a pair of beams, S. A bolt, T, is then passed through the eye, washers, and beams, securely clamping the said five parts to each other. By these means the plows may be attached to the beams with any desired strength, and at the same time in such a way that, should the plow strike an obstruction, it will be turned backward instead of being broken. By securing the washers between the beams so that they cannot turn thereon all the wear of parts due to the turning of the plow-shank is confined to the beveled faces of the metal washers and the eye of the shank. The wooden beams are, therefore, fully protected from wear. The forward ends of each of the beams S are hinged to the cross-bar I by means of a long staple, $U^1$, and a strap or clasp, $U^2$. V are brackets attached to the rear ends of the cross-bolts E, in which are journaled the ends of a long roller, W, carrying at its center a pivoted lever, X. To this lever, upon opposite sides of its pivoting point, and equally distant therefrom, are attached the ends of two ropes or chains, Y, which pass over guide-pulleys Z pivoted to the outer ends of the brackets V. The lower ends of the ropes are attached to the cross-bar A′, which extends across the machine beneath the rear parts of all the plow-beams S, so that by operating the lever X the plows may be raised and lowered as desired. The bar A′ is held in proper position with reference to the beams S by the rods L′, whose rear ends are pivoted to the bar A′ and the forward ends to the cross-bar I. To each of the brackets V is attached a rearwardly-projecting catch-arm, B′, to receive and hold the lever X, when the plows are raised, in such a position that it may be conveniently reached and operated by the driver when riding upon the cover *a* of the seed-box. In this case the lever X, when the plows are in working position, rests upon the other bracket V. To the outer end of the screw-rod N, that projects beyond the hub of the wheel G, is attached a cone-pulley, D′, the inner end of which should be recessed to receive the outer end of the wheel-hub. To the inner end of the wheel-hub is attached, or upon it is formed, a similar cone-pulley, E′, as shown in Fig. 1. F′ is an endless chain, which passes around the cone-pulley E′, over a pair of guide-pulleys, G′, suspended above the wheel and around the cone-pulley D′, so that the screw-rod N may be revolved to feed the seed to the discharge-openings $m^2$ of the pipe M by the advance of the machine. The block of the pulleys G is suspended from the upper end of the lever H′, which is pivoted to one end of the seed-box. The lower end of this lever projects to the rear of the seed-box, and to it is attached the end of a coiled or equivalent spring, I′, the other end of which is secured to the seed-box. The spring I′ should have sufficient strength to hold the chain or band F′ taut enough to revolve the screw-rod N. To the rear part of the lever H′ is pivoted the upper end of a rod, J′, which passes down through the end of the bar A′, and is provided with an adjustable collar, K′.

By this construction, when the bar A′ is operated to raise the plows from the ground, said bar strikes the collar K′ and raises the rear end of the lever H′ against the tension of the spring I′. By this means the chain F′ is slackened, so that the advance of the machine will not revolve the rod N.

Having thus described my invention, what I claim as new is—

1. In a seeding-machine, the seed-box, whose ends are cast with axles for the reception of the driving-wheels, substantially as described, for the purpose specified.

2. The combined broadcast-seeder and coverer, in which all the parts are supported from the driving-wheels by means of axles cast upon the ends of the seed-box, substantially as described, for the purpose specified.

3. The metallic ends of the seed-box, cast with axles for the driving-wheels of the machine, and with grooves in their proximate faces to receive the front, bottom, and rear boards of said box, substantially as described, for the purpose specified.

4. The seed-box, consisting of the grooved ends B cast with axles, the vertical front board, and inclined bottom and rear boards, all the parts being arranged and suitably clamped together, substantially as described, for the purpose specified.

5. The combination of the hollow axles F with the seed-box and rod N, substantially as described, for the purpose specified.

6. The beveled washers R, arranged betwen and secured to the beams S S so as to clamp the eye of the drag-tooth between them, the whole being held together by the bolt T, substantially as described, for the purposes specified.

7. The arrangement of the cone-pulleys D′ E′ and endless chain F′ with the traction-wheel G and screw-rod N, substantially as described, for the purpose specified.

8. In combination with the chain F′, by which motion is communicated from the driving-wheel to the screw-rod, a yielding support and guide, substantially as described, for the purpose specified.

9. In combination with the pivoted spring-lever H′, the rod J′ and lifting-bar A′, and suitable machinery for connecting the spring-lever to the driving-wheel, substantially as described, for the purpose specified.

10. The hollow axles F, cast solid with the ends B of the seed-box A, substantially as herein shown and described, for the purpose specified.

11. The combination of the rock-shaft W and pivoted lever X with the brackets or supports V, chains Y, cross-bar A′, and beams S, substantially as described, for the purposes specified.

12. The spring I′, pivoted lever H′, and pulley-block G′, combined, as described, with the chain F′, for the purpose of holding the latter in sufficient frictional contact with the pulleys to rotate the screw.

13. The rod J′, passing loosely down through bar A′, and collared at K′ above it, combined, as described, with the lever H′ to allow the elevation of said bar A′ to raise the end of the lever, slacken the chain, and stop the rotation of the screw, substantially as set forth.

Witnesses: LYMAN WIGHT.
SYLVESTER HANSON,
CHARLES E. GREEN.